(12) United States Patent
Smolarek

(10) Patent No.: US 7,665,197 B2
(45) Date of Patent: Feb. 23, 2010

(54) WORK HOLDER DEVICE AND A MACHINE TOOL FITTED WITH IT

(75) Inventor: Andreas Smolarek, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 40 days.

(21) Appl. No.: 12/084,086

(22) PCT Filed: Oct. 28, 2006

(86) PCT No.: PCT/EP2006/010393

§ 371 (c)(1), (2), (4) Date: Apr. 24, 2008

(87) PCT Pub. No.: WO2007/059845

PCT Pub. Date: May 31, 2007

(65) Prior Publication Data

US 2009/0079121 A1    Mar. 26, 2009

(30) Foreign Application Priority Data

Nov. 26, 2005  (DE) .................. 10 2005 056 449

(51) Int. Cl.
B23Q 7/02 (2006.01)
(52) U.S. Cl. .............. 29/33 P; 198/346.1; 269/309
(58) Field of Classification Search ............... 29/33 P, 29/563, 38 R, 38 A; 198/346.1, 345.3; 269/309
See application file for complete search history.

(56) References Cited

U.S. PATENT DOCUMENTS

| 4,583,631 A | * | 4/1986 | Yonezawa et al. ........ 198/345.3 |
| 4,673,076 A | | 6/1987 | Mattson |
| 4,695,047 A | * | 9/1987 | Ehrhardt et al. ............ 269/309 |
| 4,738,439 A | * | 4/1988 | Satake ........................ 269/309 |
| 4,754,801 A | | 7/1988 | Ueno et al. |
| 4,784,064 A | * | 11/1988 | Nemirovsky et al. ........ 104/135 |
| 5,027,488 A | * | 7/1991 | Lyerly et al. ................ 29/33 P |
| 5,242,043 A | * | 9/1993 | Sturm ..................... 198/345.3 |

(Continued)

FOREIGN PATENT DOCUMENTS

DE    70 28 724 U1    4/1976

(Continued)

OTHER PUBLICATIONS

Machine Translation for DE 7028724-U, which DE '724 was published in Apr. 1976.*

(Continued)

Primary Examiner—Erica E Cadugan
(74) Attorney, Agent, or Firm—Flynn, Thiel, Boutell & Tanis, P.C.

(57) ABSTRACT

The invention relates to a work holder device designed for holding work for machining by a machine tool and to a machine tool equipped with such a holder device. The work holder device includes a carrier fixture and at least one transferable jig adapted to be attached to the carrier fixture, such transferable jig having a work trap for receiving and holding the work, the at least one transferable jig being able to be inserted on a linear guide arrangement like a drawer into a trap of the transferable jig in an insertion plane and being able to be fixed in the trap in a fixing position.

23 Claims, 4 Drawing Sheets

U.S. PATENT DOCUMENTS

| | | | |
|---|---|---|---|
| 5,788,225 A * | 8/1998 | Iwata et al. | 269/309 |
| 5,992,608 A * | 11/1999 | Ahn | 198/346.1 |
| 6,530,300 B2 | 3/2003 | Nakai et al. | |
| 7,213,316 B2 | 5/2007 | Kato | |
| 2001/0047701 A1 | 12/2001 | Nakai et al. | |
| 2005/0143236 A1 | 6/2005 | Nakazawa et al. | |
| 2005/0254914 A1 | 11/2005 | Kato | |
| 2006/0130311 A1 | 6/2006 | Kikuchi | |

FOREIGN PATENT DOCUMENTS

| | | |
|---|---|---|
| DE | 36 06 066 C2 | 9/1986 |
| EP | 1 160 053 A2 | 12/2001 |
| EP | 1 591 194 A2 | 11/2005 |
| JP | 03-221345 A * | 9/1991 |
| JP | 2000-005966 A * | 1/2000 |
| JP | 2001-009665 A * | 1/2001 |
| WO | WO 2005/053900 A1 | 6/2005 |

OTHER PUBLICATIONS

Machine Translation of JP-2000-005966-A, which JP '966 was published in Jan. 2000.*

Office Action of the Germany Patent Orrice dated Jul. 27, 2006 (3 pages).

Notification of Transmittal of International Search Report dated Feb. 6, 2007 (2 pages) Form PCT/ISA/220.

International Search Report dated Feb. 6, 2007 (4 pages) Form PCT/ISA/210.

Written Opinion of International Searching Authority (5 pages) Form PCT/ISA/237.

* cited by examiner

EMBODIMENT WHEREIN THE FIXING ARRANGEMENT INCLUDES AT LEAST ONE PARTIALLY SPHERICAL FIXING BODY THAT FITS INTO A CORRESPONDING AT LEAST PARTIALLY SPHERICAL FIXING SOCKET.

FIG. 4

EMBODIMENT WHEREIN THE LINEAR GUIDE MEANS INCLUDE PROJECTIONS IN THE FORM OF SLIDE RAILS ON THE TRANSFERABLE JIG THAT FIT INTO GROOVES OF THE TRAP.

FIG. 5

WORK HOLDER DEVICE AND A MACHINE TOOL FITTED WITH IT

BACKGROUND OF THE INVENTION

The invention relates to a work holder device for holding work for machining by a machine tool and a machine tool fitted therewith.

The machine tool is for example a milling machine, a drilling machine or a metal turning machine, which machines the work by chip removal. Furthermore the machine tool may be an assembly machine. The work, as for example a piston rod or a pitman, is held by the work holder device during machining by the machine tool. The work holder device, for example a work table with one or more work traps, may be pivoted in a work area of the machine tool.

The traps for the work must be adapted to suit the respective type of work. For example abutment members can be arranged on the work holder device and form the trap and hold the work. When another type of work is to be machined, it is necessary either for the entire work holder device to be replaced or the work holder device must be reconfigured, for example by replacing holders and/or mounting them at a different position on the work holder device. Such reconfiguration is complex and expensive and leads to idle times for the machine tool.

SHORT SUMMARY OF THE INVENTION

It is therefore an object of the invention to design an adaptable work holder device suitable for different sorts of work.

This object is attained by a work holder device for holding a work for machining by a machine tool, comprising a carrier fixture and at least one interchangeably attachable transferable jig adapted to be attached to the carrier fixture, such jig having a work trap for receiving and holding the work, the at least one transferable jig being able to be inserted on a linear guide arrangement like a drawer into a trap of the carrier fixture in an insertion plane and being able to be fixed in the trap by a fixing arrangement in a fixing position.

For each type of work, for example for different types of piston rods, different types of transferable jigs are provided which can be readily arranged on the carrier fixture. The jigs are slid into the trap and fixed in position by means of the fixing arrangement. If now different work is to be machined, which for example has a different geometry or is to be positioned in a different position in relation to the machine tool, only the jig has to be substituted, a task able to be very rapidly performed. The reconfiguration of the work holder device may be performed quickly. In principle it would admittedly be possible for the work to remain on the jig, which would then act as a sort of palette. It is however convenient for the jig to dwell on the work holder device as long as the respective transferable jig is needed for further work items whereas the work is changed.

The work holder device in accordance with the invention preferably constitutes a component of a machine tool, as for example a milling, drilling, metal turning machine, for chip removal and/or severing the work or, respectively, for assembly, Further advantageous developments of the invention are defined in the claims.

It is an advantage for the linear guide arrangement and the fixing arrangement to be so arranged that they hold the at least one jig in corner areas of a triangle of forces on the trap. Accordingly skew positioning of the jig on the trap is avoided and simultaneously the jig is reliably held.

The fixing arrangement preferably clamps the jig in the fixing position. For this purpose it is preferred for one or more spring arrangements to be provided. It is more particularly preferred for the fixing arrangement to center the transferable jig at the trap so that it is arranged on the trap in a predetermined position, something which renders possible precise positioning of the work on the jig. For instance the fixing arrangement can comprise one or more spherical and/or conical fixing faces. It is more particularly preferred for the fixing arrangement to possess at least one at least partially spherical and/or conical fixing body, which fits into a correspondingly shaped fixing socket which is correspondingly at least partly part-spherical or, respectively, conical. The fixing body preferably constitutes a component of the carrier fixture.

The fixing socket, which is for example funnel-like or saucepan-like, is preferably arranged on the work support or jig. It will be evident that a reverse arrangement is also possible, for example so that on the carrier fixture a conical or spherical fixing section is arranged, which fits into a corresponding fixing socket on the carrier fixture.

The fixing socket preferably possesses an insertion opening for the introduction from the side of the fixing body. For example the fixing socket may fit around a shank section of the fixing body like a fork. It will also be clear that a punch-like fixing body is conceivable which fits into a fixing socket closed at the bottom and centers or fixes same.

The shank section preferably fits through an opening in the fixing socket athwart the plane of insertion so that a centering face, which extends radially inward in a spherical or conical manner, as for example a conical peripheral face or a spherical face, rests in the fixing position on one or more funnel-like centering faces of the fixing socket. This centering face is for example funnel-like toward the opening of the fixing socket.

Preferably the fixing arrangement has a support face for making supporting contact with the transferable jig, for example at its bottom side. The transferable jig, as for example at a front section of the jig, is preferably clamped in the fixing position between the fixing body and the supporting face.

For such clamping there is best a spring arrangement, which thrusts the transferable jig into the fixing position as it were. The spring arrangement preferably holds the fixing body with a fixing force in clamping engagement in the fixing socket. For this purpose there is for example a spring arrangement, which on the one hand bears against the fixing body and on the other hand against the carrier fixture and accordingly thrust the fixing body into the fixing socket.

In principle the fixing arrangement could be released manually. But however the work holder device is best made with a release actuator for the fixing arrangement. The fixing arrangement will act, for example, against the force of the spring arrangement. The release actuator, for example a hydraulic or pneumatic linear cylinder or rotary drive, for release of the fixing arrangement sets the fixing body in a release position, in which the fixing body is moved clear of the fixing socket and releases the jig.

The linear guide arrangement preferably comprises two linear guide means for guidance of mutually opposite side areas of the transferable jig. For example projections or grooves are provided on lateral parts of the trap, which cooperate with corresponding grooves and projections on the jig. The linear guide means are preferably arranged in the vicinity of an insertion receiving opening in the trap. It is convenient to arrange the fixing arrangement at a closed end area of the trap so that the initially mentioned three point fixation adjacent to a triangle of forces is possible. It is more particularly preferred for the fixing arrangement to be arranged generally near an axis of symmetry between the two linear guide means.

The carrier fixture is preferably plate-like at the trap.

A support portion of the jig is preferably also plate-like. Holders are able to be preferably releaseably attached to the support part to form the work trap. Thus the jig is also able to be adapted to different types of tools. The holder may for example comprise abutment members for the work, and supporting part for the work to be supported or the like. It is more especially preferred for one or more of the abutment members to be movable and more particularly to be pivotal so that the respective holder is able to be reset in position between a holding position holding the work and a release position, in which the work may be removed from the jig. For example the spring arrangement may be provided, which braces the holder into a position holding or clamping the work.

On the support part, on one or more holders, between the holders or the like it is preferred to provide openings, recesses and clearances so that the work is accessible for machining by a tool of the machine tool.

The carrier fixture is preferably in the form of a tool changing means including several traps for jigs in accordance with the invention. The carrier fixture may for example comprise a work pivoting arrangement on which several traps are provided for interchangeable attachment of jigs in accordance with the invention. It will be evident that furthermore linear conveying means, as for example conveying chains, conveying belts or the like, may be adapted to different types of work readily with the aid of the jig in accordance with the invention. The jigs in accordance with the invention are then arranged adjacent to each other, for example in a row direction.

A particularly preferred design of the invention provides a work table which is advantageously able to be rotated about an axis of rotation. In the case of the work table able to be rotated about a preferably vertical axis of rotation the traps are arranged radially about the axis of rotation. In the case of the work table later to be described as a part of the working example of the invention for example four traps are orientated in relation to each other in across. It will be clear that furthermore two or more or less traps are possible, for example on a round table or the like. The traps are for example arranged on several support plates or on a single support plate of the work table.

In the case of the carrier fixture designed in the form of a work changing means it is possible for the work to be conveyed, and more particularly swung, from a loading station to a machining station and thence to a removal station.

Furthermore the work holder device will preferably comprise a changing station, at which the at least one transferable jig may be changed. At this change station the above mentioned described release actuator is preferably located.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

Figure 1:
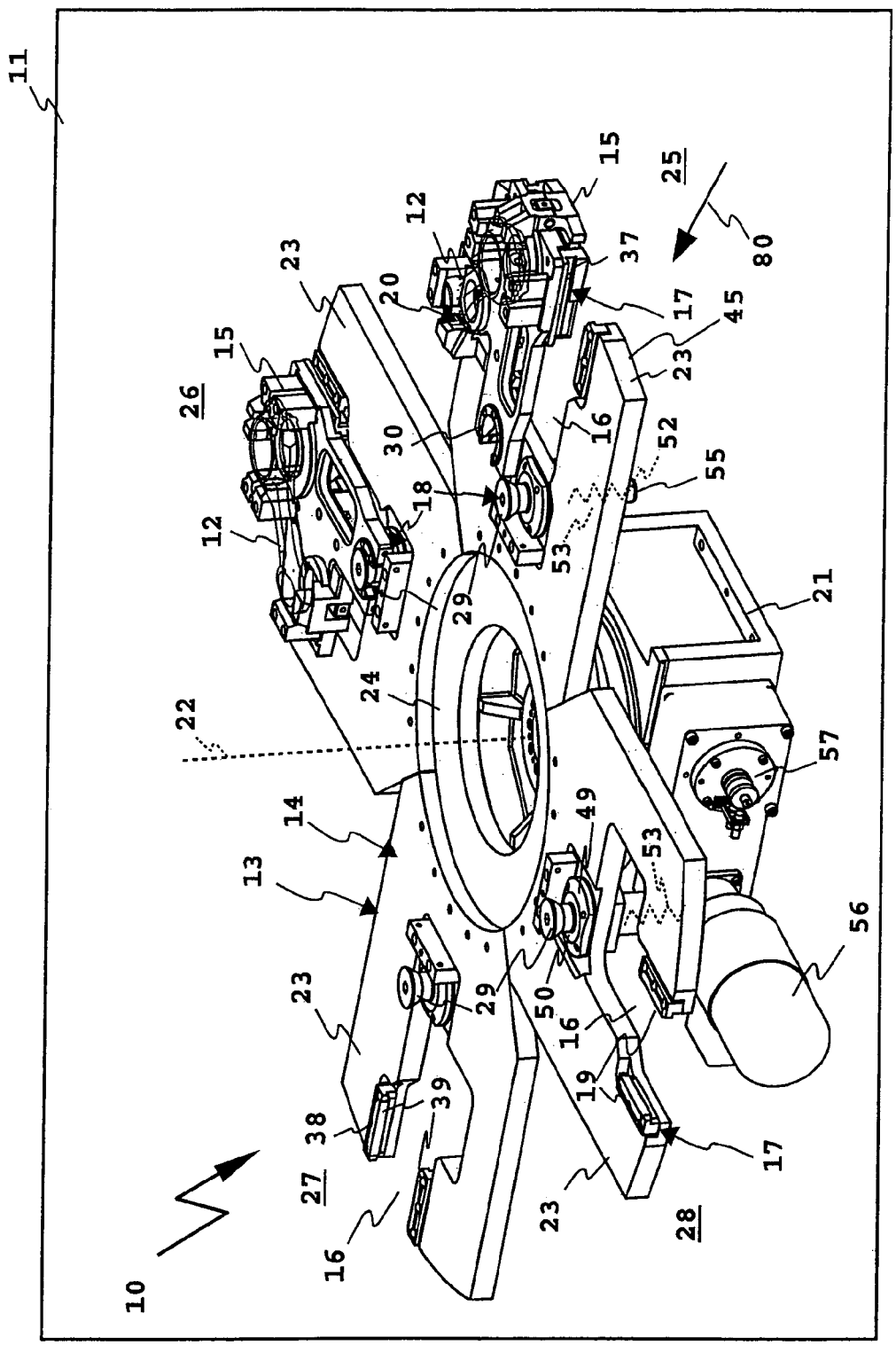
FIG. 1 is a perspective overall elevation of a work holder device in accordance with the invention.
Figure 2:
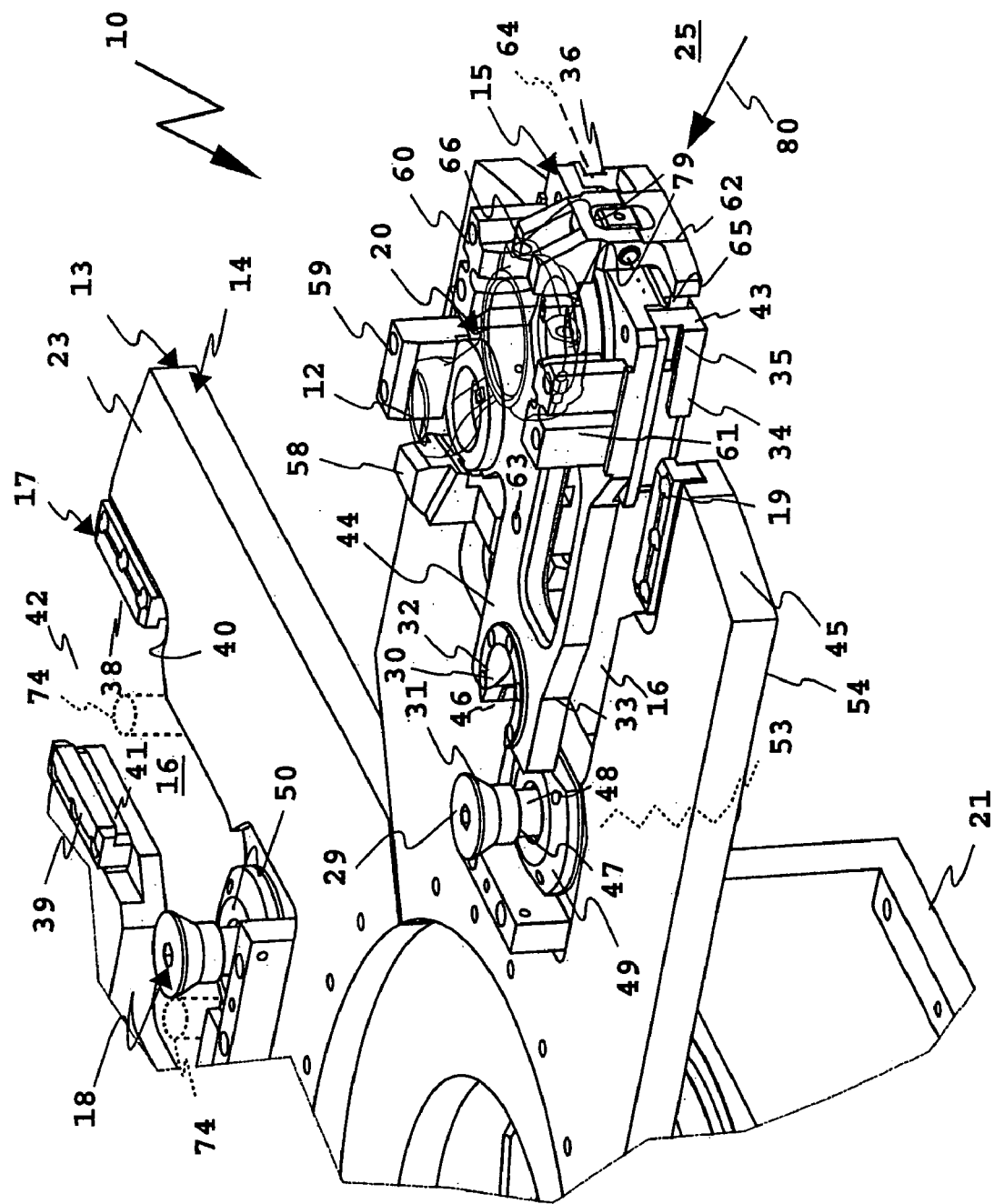
FIG. 2 is a view showing details of the view of FIG. 1, a tool support having been partly removed from a trap and being seen from the back thereof.
Figure 3:
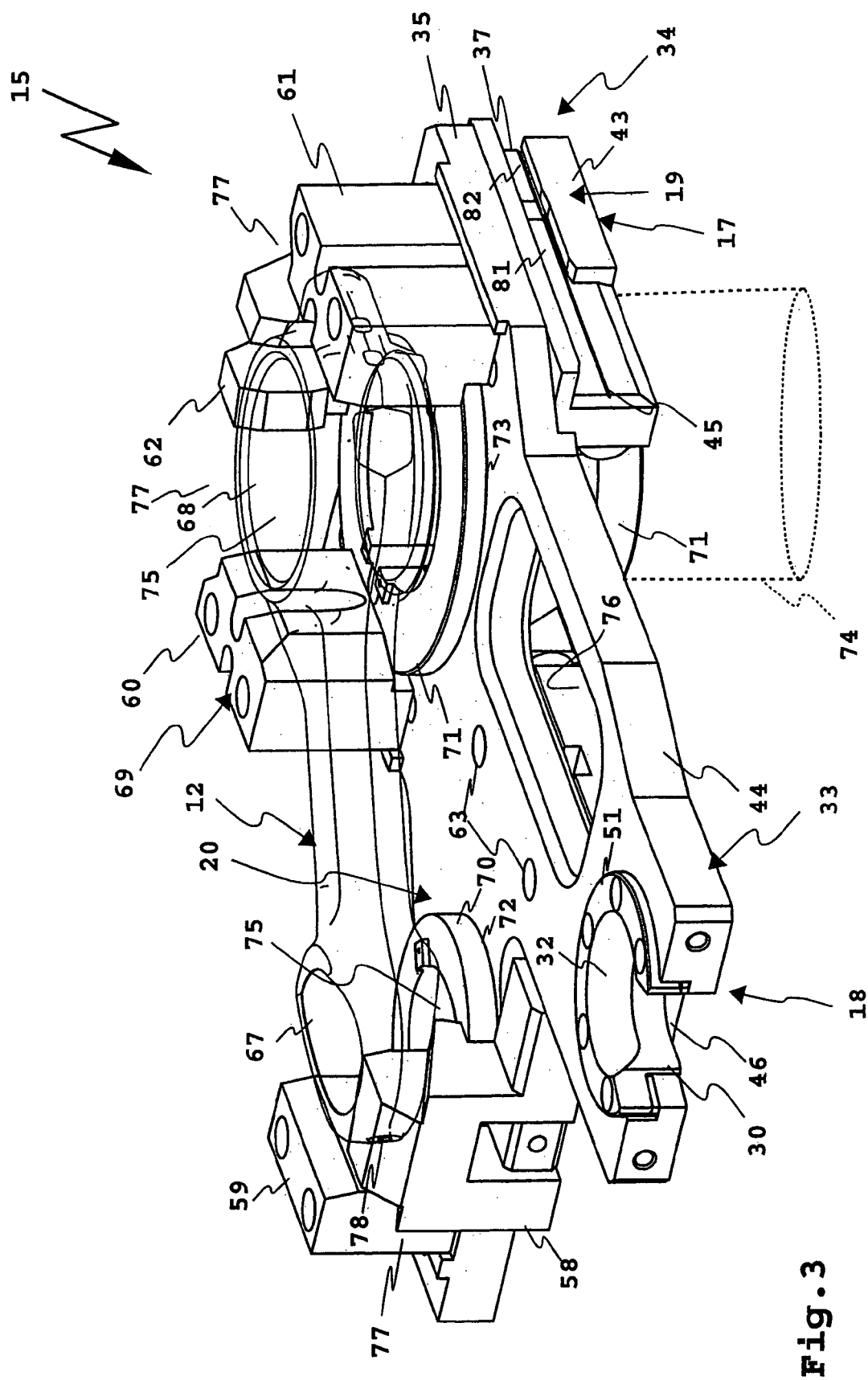
FIG. 3 shows tool support in accordance with FIGS. 1 and 2 in a perspective view from the front.

FIG. 4 schematically shows an embodiment wherein the fixing arrangement includes at least one partially spherical fixing body that fits into a corresponding partially spherical fixing socket.

FIG. 5 schematically shows an embodiment wherein the linear guide means include projections in the form of slide rails on the transferable jig that fit into grooves of the trap.

DETAILED ACCOUNT OF WORKING EMBODIMENT OF THE INVENTION

A work holder device 10 of a diagrammatically illustrated machine tool 11, as for example a metal turning, milling and/or drilling machine, serves for holding works 12, as for example piston rods of an internal combustion engine during machining by the machine tool 11. On a work table 13 of a support means 14 transferable jigs 15 are able to be mounted in an interchangeable manner. The transferable jigs 15 are able to be slid into traps 16 like cassettes or drawers, on the carrier fixture 14 or, respectively, the work table 13.

In order to make the drawing more straightforward the work 12 is represented as a phantom in the drawing.

Owing to the interchangeable jigs 15 the work holder device 10 can be readily adapted to different types of work, for example piston rods with different dimensions. The transferable jigs 15 are guided by a linear guide arrangement 17 and fixed in position in the respective trap 16 by a fixing arrangement 18. Thus the respective transferable jig 15 is reliably held in the trap 16. Furthermore the fixing arrangement 18 performs the function of a centering means, seeing that it centers the transferable jig 15 in the fixing position in the trap 16. Accordingly work 12, which is located in a work trap 20 of a transferable jig 15, is able to be optimally positioned for machining by the machine tool 11.

The work table 13 is able to be rotated on a base part or frame 21 about an axis of rotation 22. The traps 16 are arranged on table plates 23 of the work table 13. The table plates 23 are for example screwed to a holder 24 mounted for rotation on the frame 21.

The table plates 23 and accordingly the traps 16 are rotatably mounted on the frame 21 for turning around the axis 22 of rotation. In the frame 21 it is possible for a rotary drive, not illustrated, to be arranged on it.

Each respective trap 16 together with the jig 15 on it may for example be swung together with a loading station 25 for example, where the jig 15 has a work 12 attached to it, to a machining station 26, where the machine tool 11 performs an assembly operation on the work 12 and/or chip removal machining operation on the work 12. From the machining station 26 the work table 13 shifts the transferable jig 15 on to an unloading station 27, where the work may be removed.

Furthermore it is possible to pivot the work table 13 to a change over station 28, where the transferable jig 15 can be removed and replaced by other transferable jigs in accordance with the invention in order to adapt the work holder device 10 to different sorts of work.

The functions of the stations 25 through 28 may be different, and for example it is possible for several machining stations to be provided for machining by the machine tool 11.

The fixing arrangements 18 clamp the transferable jigs 15 in the fixing position. Then a fixing body 29 fits into a conical fixing socket 30 on a jig 15. The fixing bodies 29 and, respectively, the fixing sockets 30 are conical, i. e. a conical centering face 31 is present which in the fixing position or, respectively, clamping position abuts a funnel-like centering face 32 on the fixing socket 30.

The fixing sockets 30 are arranged on the front sections 33 of the jigs 15 and have a forked shape. At a back section 34 of the transferable jigs 15 grooves 37 are present in opposite sides 35 and 36 and projections 38 on corresponding inner sides 40 and 41 of the traps 16 fit into such grooves 37. The projections 38 are constituted by slide rails 39 which are arranged in the vicinity of the fixing opening 42 on the trap 16 and are for example secured by means of screw. The grooves 37 are provided on groove members 43 screwed at the sides 35 and 36 on a support part 44 of the respective transferable jig 15.

Accordingly the jigs 15 are respectively linearly guided along an insertion plane 45 and are held in the fixing position by the linear guide arrangement 17.

For more convenient introduction of the grooves into the slide rails 39 a front groove section 81 is widened out athwart the insertion plane 45. It will be apparent that also a widening of the groove section 81 essentially in the insertion plane 45 may be convenient. A rear section 82 of the groove on the other hand is so narrow that the slide rails 39 abut the top and bottom sides of the slide rail in the insertion plane 45, i. e. in the present case horizontally.

The fixing arrangement 18 acts on the front section 33 of a respective transferable jig 15. The transferable jigs 15 are open at the front so that the fixing bodies 29 are able to be introduced through a front insertion opening 46 in the fixing sockets 30.

The fixing bodies 29 are arranged at a top end 47 of a shank section or shank part 48. For example the fixing bodies 29 are screwed on the shank parts 48. It will be apparent that an integral structure is also possible. While the fixing socket 30 is saucepan-like or funnel-like to be open in an upward direction, the fixing bodies 29 constitute as it were the opposite structure, i. e. the centering face 31 runs from the free end of the fixing body 29 radially inward as far as the shank section 48. The fixing bodies 29 act as it were like ties on the fixing sockets 30.

The receiving opening 46 of the fixing socket 30 extends over a circular segment of less than 180 degrees so that the conical fixing body 29 can fix or lock the transferable jig 15 in the insertion direction 80, in which the jig 14 can be inserted into the trap 16. The receiving or insertion opening 46 is just large enough for the shank 48 or, respectively, the shank section 48 to be introduced into the fixing socket 30 from the front.

The shank part 48 is mounted for linear motion on a guide 49. Accordingly the fixing body 29 may move athwart the insertion plane 45 and may be reset in position between a release position, in which the jig 15 may be removed from the trap 16, and a fixed position.

The guide 49 has a support face 50 on its top for supporting the transferable jig 15 and more particularly a fixing part 51 arranged on the support part 44, on which the fixing socket 30 is formed adjacent to the top side.

Spring arrangements 52 brace the fixing arrangements 18 into the fixing position. The spring arrangements 52 include, for example, a helical spring 53 extending between the bottom side 48 of the work table 13 and a collar 55 on the respective shank part 54. Accordingly the spring arrangements 52 draw the shank parts 48 and the fixing bodies 29 arranged here at the top side downward clamping the transferable jigs 15 and more especially the fixing sockets 30 between the support face 50 and the fixing bodies 29.

At the change over station 28 the transferable jigs 15 may be changed over. A release actuator 56 at the change over station 28 resets the fixing arrangement 18, pivoted into this position, into a release position. The release actuator 56, for example a preferably pneumatic or hydraulic linear drive or a rotary drive, which has a transmission for conversion of the rotary movement into a linear one, exerts a thrust on f. i. the bottom end of a respective shank part 48 and accordingly resets the fixing body 29 at its top side in an upward direction with the result that the fixing arrangement 18 sets the transferable jig 15 free. The jig 15 can then be removed by an operator or a robot outwardly radially along the insertion plane 45 from the work table 13.

Adjacent to the release actuator 56 there is a connector 57 for connecting a rotary drive to the work table 13.

The traps 16 in the present case have an L shape, the fixing arrangement 18 being arranged at a point of intersection of the two L limbs.

On the plate-like support parts 44 of the transferable jig 15 holders 58 through 62 are arranged for the work 12. The holders 58 through 62 are for example screwed to the support part 44 or plugged onto the support part 44. Screws, which are not referenced, are inserted through assembly holes 63 and screwed into the respective holder 58 through 62. The holders 58 through 62 form lateral abutment members 69 for the work 12. The holders 58 through 62 are for example abutments, sprags or other fixing elements for holding the work 12.

The work 12, in the present case a piston rod, is diagonally clamped and held on the holders 58 through 62. Here the holders 58 and 59 cooperate with a small eye 67. The holders 58 and 59 are arranged at a corner.

The holders 60 through 62 cooperate with a large eye 68 in the work 12. The holders 60 through 62 are arranged in the form of a letter U about the large eye 68, the holders 61 and 62 constituting U-like limbs.

The holder 62 is a pivoting holder, arranged to pivot about a pin 64 on the support portion 44. Spring elements 65 draw the holder 62 forward into a holding position clamping and holding the work 12. An abutment portion 66 of the holder 62 may be pivoted for opening the work trap 20 in an outward direction so that the work 12 may be retrieved from the work trap 20.

The work rests on support parts 70 and 71, which are attached of the support portion 44, preferably in a removable manner. The support part 70 is provided for the small eye 70 and the support part 71 for the large eye 68. The support parts 70 and 71 are introduced into openings 72 and 73 in the support portion 44. More particularly at the machining station 26 it is possible for tube-like supports 74, diagrammatically indicated in the drawing, to be present, on which the support parts 70 and 71 rest during machining the work 12. This means that the transferable jigs 15 are supported from below.

The support parts 70 and 71 have through holes 75, for example for a tool drilling out the eyes 67 and 68 and/or an assembly tool, more particularly a tool for the introduction of the bearing sleeves into one of the eyes 67.

On the support part 44 it is possible for further openings, as for example a through opening 76, to the provided, which are necessary for any retooling of the support part 44 with holders for assembly operations on the work 12 and/or for a more particularly chip removing machining operation on the work 12.

Between the holders 58 and 59, the holders 60 and 62 and furthermore 62 and 61 clearances 77 are present rendering possible machining of the work 12 from the side. For example the clearances 77 are big enough for a drill to drill an oil hole 78 into the small eye 67 and for boring assembly holes 78 from the side into the large eye 68 of the work 12. The clearances 77 are also appropriate for assembly machining, for example for screwing in screws into the work 12, for example into the assembly holes 79.

It is possible as well for the machine tool 11 to perform a severing operation at the machining station 26 on the work 12, for example at the eye 68 to cut off a cover from the piston rod or work 12, such operation for example involving producing a notch and then severing the cover as part a so-called cracking operation.

The invention claimed is:

1. A work holder device for holding a work for machining by a machine tool, comprising a carrier fixture that is rotatable about an axis of rotation, and at least one interchangeably attachable transferable jig adapted to be attached to the carrier fixture, such at least one jig having a work trap for receiving and holding the work, the at least one transferable jig being able to be inserted on a linear guide arrangement like a drawer into a jig trap of the carrier fixture in an insertion plane and being able to be fixed in the jig trap by a fixing arrangement in a fixing position, there being a plurality of the jig traps arrangeable radially about the axis of rotation, the at least one jig having a forked end section for receiving a shank section of the fixing arrangement, the forked end section having an end that is open at a radially inner end of the respective jig trap and an end radially spaced therefrom opposite the open end that is closed.

2. The work holder device as set forth in claim 1, wherein the linear guide arrangement and the fixing arrangement hold the at least one transferable jig in corner areas of a triangle of forces at the respective jig trap.

3. The work holder device as set forth in claim 2, wherein the fixing arrangement holds the at least one transferable jig at a corner area of the triangle of forces and the linear guide arrangement at further corner areas of the triangle of forces at the respective jig trap.

4. The work holder device as set forth in claim 1, wherein the fixing arrangement clamps the at least one transferable jig in the fixing position.

5. The work holder device as set forth in claim 1, wherein the fixing arrangement centers the at least one transferable jig at the respective jig trap.

6. The work holder device as set forth in claim 1, wherein the fixing arrangement comprises at least one partially spherical or conical fixing body fitting into a corresponding at least partially part-spherical or conical fixing socket.

7. The work holder device as set forth in claim 6, wherein the forked end section defines the fixing socket, and the open end of the forked end section is configured to permit the lateral introduction of the at least one fixing body therein.

8. The work holder device as set forth in claim 6, wherein the shank section is part of the at least one fixing body and the forked end section defines the fixing socket, the shank section extends through the fixing socket transversely to the insertion plane so that at least one centering face, which extends spherically or conically radially inward in relation to the shank section, of the at least one fixing body in the fixing position abuts against a funnel-shaped centering face of the fixing socket.

9. The work holder device as set forth in claim 1, wherein the fixing arrangement has a support face for engagement with the at least one transferable jig and wherein the at least one transferable jig is clamped in the fixing position between a fixing body of the fixing arrangement and the support face.

10. The work holder device as set forth in claim 9, wherein a radially inner section of the at least one transferable jig is clamped in the fixing position between the fixing body of the fixing arrangement and the support face.

11. The work holder device as set forth in claim 1, wherein a fixing body of the fixing arrangement which is connected to an upper end of the shank section is biased into the fixing position by a spring arrangement.

12. The work holder device as set forth in claim 1, further comprising a release actuator for release of the fixing arrangement.

13. The work holder device as set forth in claim 1, wherein the linear guide arrangement comprises two linear guide means for guidance of mutually opposite side areas of the at least one transferable jig.

14. The work holder device as set forth in claim 13, wherein the linear guide means have projections in the form of slide rails at the respective jig trap or the at least one transferable jig, which fit into grooves inside the at least one transferable jig or the respective jig trap, respectively.

15. The work holder device as set forth in claim 13, wherein the linear guide means are arranged at an insertion opening of the respective jig trap spaced radially outward from the inner end of the respective jig trap, and the fixing arrangement is arranged adjacent the inner end of the respective jig trap, the inner end of the respective jig trap being closed.

16. The work holder device as set forth in claim 1, wherein the carrier fixture is plate-like at the respective jig trap.

17. The work holder device as set forth in claim 1, wherein the at least one transferable jig has a plate-like support portion.

18. The work holder device as set forth in claim 17, wherein the support portion of the at least one transferable jig has at least one holder releaseably attached thereto for the formation of the work trap.

19. The work holder device as set forth in claim 18, wherein the at least one holder comprises at least one abutment member for the work and/or at least one support part for support of the work.

20. The work holder device as set forth in claim 19, wherein an opening, a recess or a clearance is present at the at least one support part and/or the at least one holder for a tool for machining the work.

21. The work holder device as set forth in claim 1, wherein the axis of rotation of the carrier fixture is vertical.

22. A machine tool having a work holder device as set forth in claim 1.

23. The machine tool as set forth in claim 22, in the form of an assembly machine for assembly work on the work and/or a machine tool for severing parts of the work and/or a machine tool for chip removing machining work.

* * * * *